US012010390B2

(12) United States Patent
Li

(10) Patent No.: US 12,010,390 B2
(45) Date of Patent: Jun. 11, 2024

(54) LIVE STREAMING PRODUCT CREATION AND ORDER COMPILATION

(71) Applicant: Popshop Technologies, Inc., Los Angeles, CA (US)

(72) Inventor: Danielle Li, Los Angeles, CA (US)

(73) Assignee: CommentSold, LLC, Huntsville, AL (US)

(*) Notice: Subject to any disclaimer, the term of this patent is extended or adjusted under 35 U.S.C. 154(b) by 0 days.

(21) Appl. No.: 17/513,873

(22) Filed: Oct. 28, 2021

(65) Prior Publication Data

US 2022/0141538 A1 May 5, 2022

Related U.S. Application Data

(60) Provisional application No. 63/107,918, filed on Oct. 30, 2020.

(51) Int. Cl.
*H04N 21/478* (2011.01)
*G06Q 30/0601* (2023.01)
*H04N 21/2187* (2011.01)

(52) U.S. Cl.
CPC ... *H04N 21/47815* (2013.01); *G06Q 30/0603* (2013.01); *G06Q 30/0641* (2013.01); *H04N 21/2187* (2013.01)

(58) Field of Classification Search
CPC .................................. H04N 21/47815
USPC .................................. 725/60
See application file for complete search history.

(56) References Cited

U.S. PATENT DOCUMENTS

| | | | |
|---|---|---|---|
| 2008/0104141 A1 | 5/2008 | McMahon | |
| 2012/0311680 A1 | 12/2012 | Lunt | |
| 2013/0246454 A1 | 9/2013 | Menten | |
| 2018/0108266 A1* | 4/2018 | Stoner | G06Q 30/0203 |
| 2018/0192087 A1* | 7/2018 | Dudko | H04N 21/814 |
| 2018/0255114 A1* | 9/2018 | Dharmaji | G06F 16/435 |
| 2019/0342618 A1* | 11/2019 | Dudko | H04N 21/4825 |
| 2020/0288200 A1* | 9/2020 | Ho | H04N 21/2187 |
| 2020/0302423 A1* | 9/2020 | Vijayaraghavan | G06Q 20/322 |
| 2021/0037267 A1* | 2/2021 | Shore | H04N 21/2187 |
| 2022/0070504 A1* | 3/2022 | Hartnett | H04L 12/1827 |
| 2022/0095016 A1* | 3/2022 | McKinney | H04N 21/2187 |
| 2022/0284495 A1* | 9/2022 | Knezi | H04N 21/47815 |
| 2022/0337898 A1* | 10/2022 | Dorogusker | H04N 21/47815 |

OTHER PUBLICATIONS

International Search Report in PCT International Application No. PCT/US21/57163, dated Jan. 21, 2022.

* cited by examiner

*Primary Examiner* — Mushfikh I Alam
(74) *Attorney, Agent, or Firm* — Cognition IP, P.C.; Edward Steakley; Rajesh Fotedar

(57) ABSTRACT

Methods, systems and computer products disclosed herein are directed to an O.C. Engine that detects a first request sent from a requesting account during a target account session, the target account associated with multiple sessions. The O.C. Engine generates a first request parent node active for a range of time. The O.C. Engine detects a subsequent second request sent from the requesting account and generates a second request node. The O.C. Engine verifies that the subsequent second request is not an initial request by the requesting account during a range of time that has not yet expired. Upon verification, the O.C. Engine identifies the second request node as a child node by generating a link between the parent node and the child node.

18 Claims, 8 Drawing Sheets

LIVE STREAMING PRODUCT CREATION AND ORDER COMPILATION

CROSS-REFERENCE TO RELATED APPLICATIONS

This application claims the benefit of U.S. Provisional Patent Application No. 63/107,918, filed Oct. 30, 2020, which is hereby incorporated by reference in its entirety.

BACKGROUND

Live video streaming allows for video data to be sent to multiple computer devices for display at each computer device. Various websites allow for channels associated with a primary user account that is a source of produced content, either as recorded content for later playback or as content produced in real-time or on-demand. Such conventional channels further allow for other user accounts to submit comments to a webpage associated with the channel and/or send messages to the primary user account during distribution of real-time or on-demand content.

SUMMARY

Further areas of applicability of the present disclosure will become apparent from the detailed description, the claims and the drawings. The detailed description and specific examples are intended for illustration only and are not intended to limit the scope of the disclosure.

Methods, systems and computer products disclosed herein are directed to an Order Compilation Engine. The Order Compilation Engine detects a first request sent from a requesting user account during a first session associated with a target user account, whereby the target account may be associated with multiple sessions accessible by the requesting user account and multiple other user accounts. The Order Compilation Engine generates a parent node associated with the first request to be active for a range of time selected by the target user account. The range of time initiates based on generation of the parent node. The Order Compilation Engine detects a subsequent second request sent from the requesting user account to the target user account and generates a node associated with subsequent second request. The Order Compilation Engine verifies that the subsequent second request is not an initial request by the requesting user account during the range of time. The Order Compilation Engine further verifies that the subsequent second request has been detected prior to expiration of the range of time. Upon verification, The Order Compilation Engine identifies (i.e. labels, defines, flags) the node as a child node by generating a link to connect the parent node and the child node. The Order Compilation Engine may further generate child nodes representing additional subsequent request from the requesting user account detected during the range of time. Each additional child node may be linked to the same parent node as well.

According to various embodiments, a session associated with a target user account may be a live video stream where the target user account is the host of the live video stream. The live video stream may display content based on a view of a camera of a host computer device. Each user account accessing a respective live video stream may be a viewer user account viewing the live video stream at a viewer computer device. The Order Compilation Engine (hereinafter "O.C. Engine") detects a first request sent from a viewer user account to the host user account during a first live video stream. The O.C. Engine verifies that no other requests have been received from the viewer account. Upon verification, the O.C. Engine generates a parent node associated with the first request to be active until expiration of a range of time selected by the host user account.

The O.C. Engine detects a second request sent from the viewer user account to the host user account. The second request may be detected during the first live video stream or during a second live video stream from the host user account that began after termination of the first live video stream. The O.C. Engine generates a node for the second request. The O.C. Engine verifies the second request is not the viewer user account's initial request sent to the host user account and that the range of time has not expired. For example, the O.C. Engine may detect that an active parent node for the viewer user account corresponds with the host user account. Upon verification, the O.C. Engine identifies the second request's node as a child node (i.e. subordinated node) by linking the child node to the parent node (i.e. primary node). When the range of time expires, the O.C. Engine does not allow for additional requests from the viewer user account to trigger generation of more child node's to be linked to the parent node.

According to various embodiments, each request from the viewer user account may be a request to purchase a respective item(s) from the host user account. According to various embodiments, the O.C. Engine compiles (i.e. merges, collects) the parent and child nodes (i.e. primary and subordinate nodes) that represent the viewer user account's purchase requests into a parent order. The parent order may be a transaction order for concurrent purchase of all the items represented by the parent and child nodes where the concurrent purchase is triggered upon expiration of the range of time. According to various embodiments, a transaction fee may be applied to the transaction order based on the parent node. For example, the transaction fee may be a shipping charge to send all the items requested for concurrent purchase by the viewer user account received during the range of time. The shipping charge may be assessed by the O.C. Engine at the time the parent node is generated, and no further shipping charges are assessed due to items purchased according to additional child nodes (i.e. subsequent purchase requests). Upon execution of the concurrent purchase, a shipping label with a physical address associated with the viewer user account may be generated by the O.C. Engine and sent to the host user account for shipment to of all the respective items selected for the concurrent purchase.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
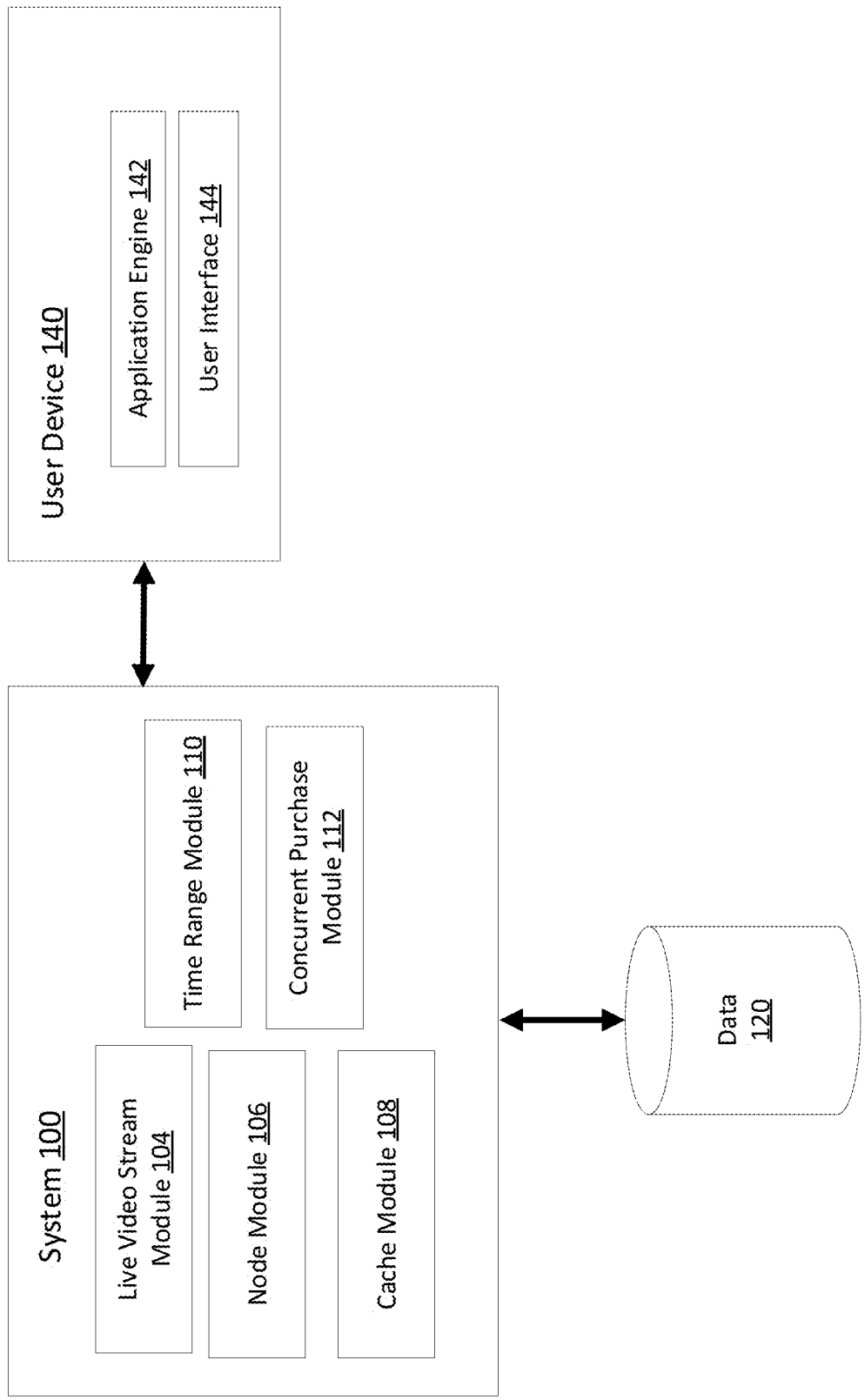
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a diagram illustrating an exemplary environment in which some embodiments may operate. FIG. 1 illustrates a block diagram of an example system 100 that includes a live video stream module 104, a node module 106, a cache module 108, a time range module 110 and a concurrent purchase module 112. The system 100 may communicate with a user device 140 (such as a host computer device, a viewer computer device) via a network to display output, via a user interface 144 generated by an application engine 142. The database 120 may further be a component of the system 100 and may be implemented in any manner that promotes retrieval and storage efficiency, privacy and/or data security.

The live video stream module 104 of the system 100 may perform functionality for as illustrated in FIGS. 2, 3, 4, 5 and 7.

The node module 106 of the system 100 may perform functionality for as illustrated in FIGS. 2, 3, 4, 5, 6, and 7

Figure 2:
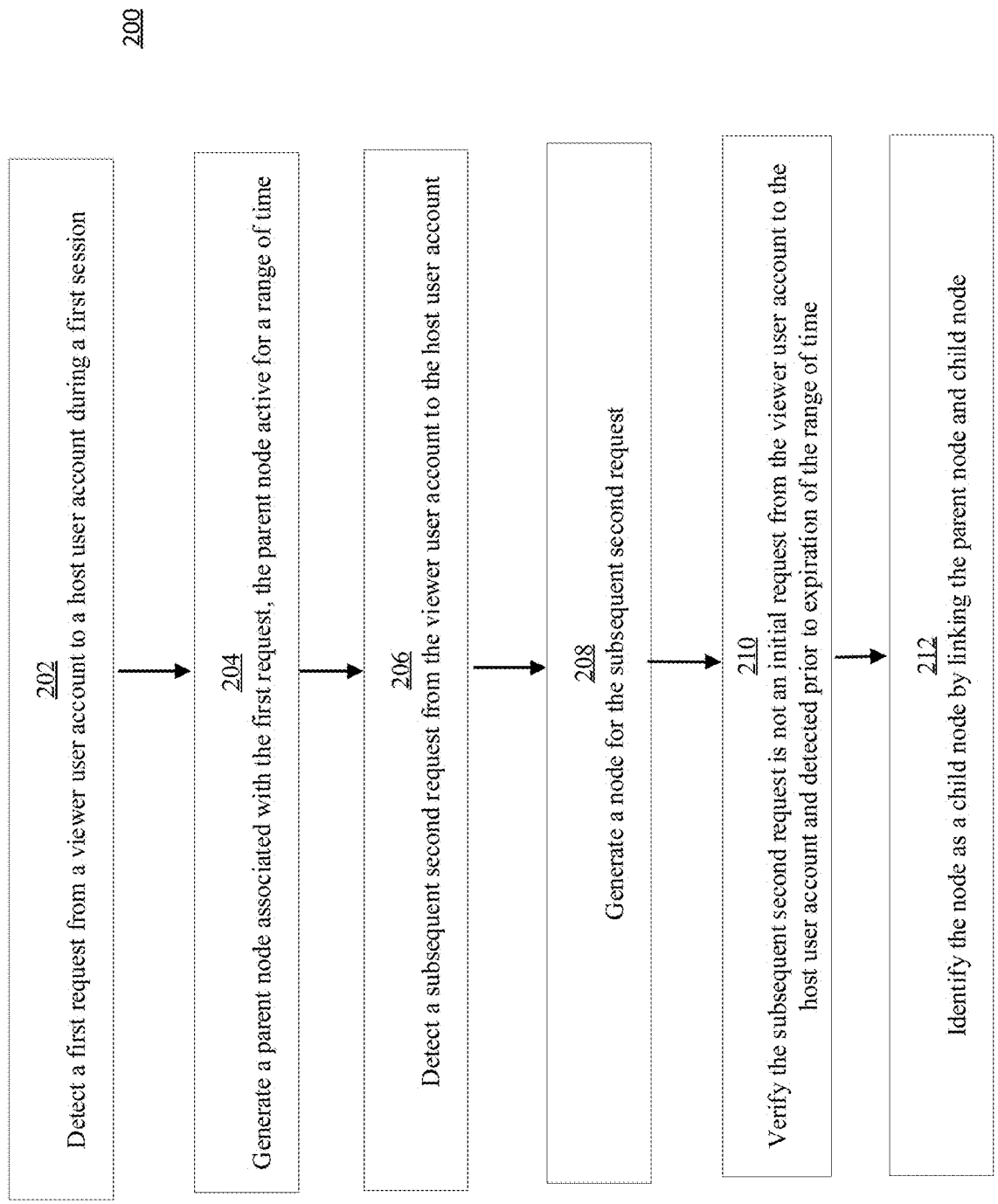
FIG. 2 is a flowchart illustrating exemplary methods that may be performed in some embodiments.
Figure 6:
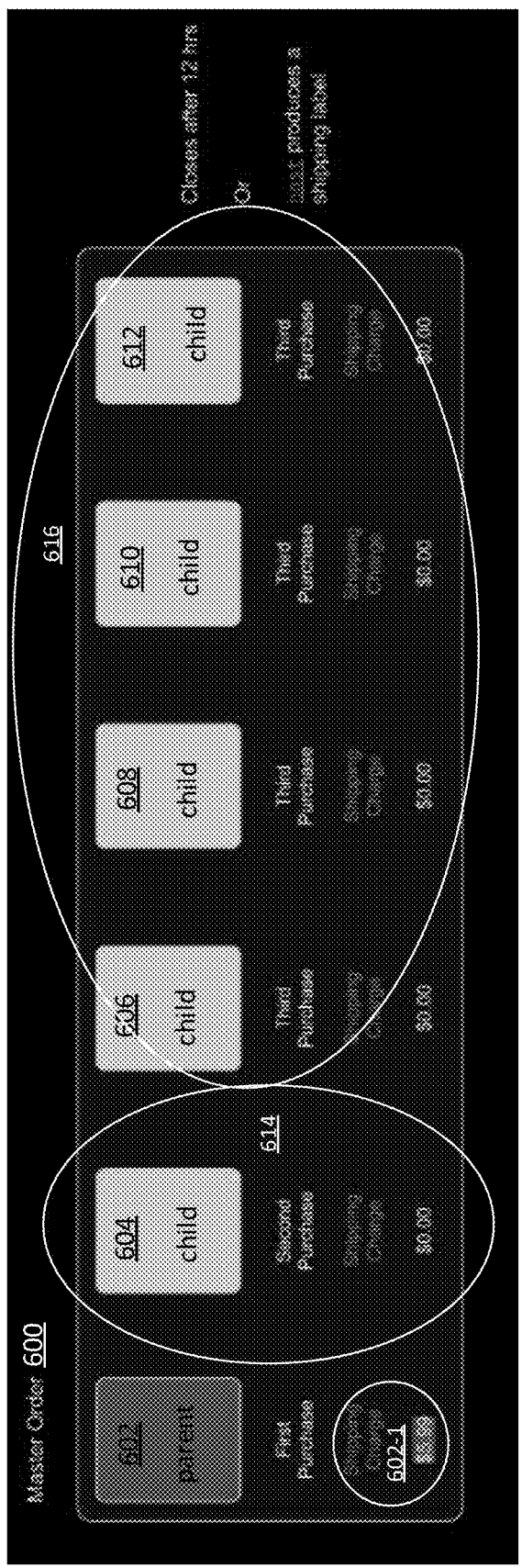
FIG. 6 is a diagram illustrating an exemplary environment in which some embodiments may operate.
Figure 7:
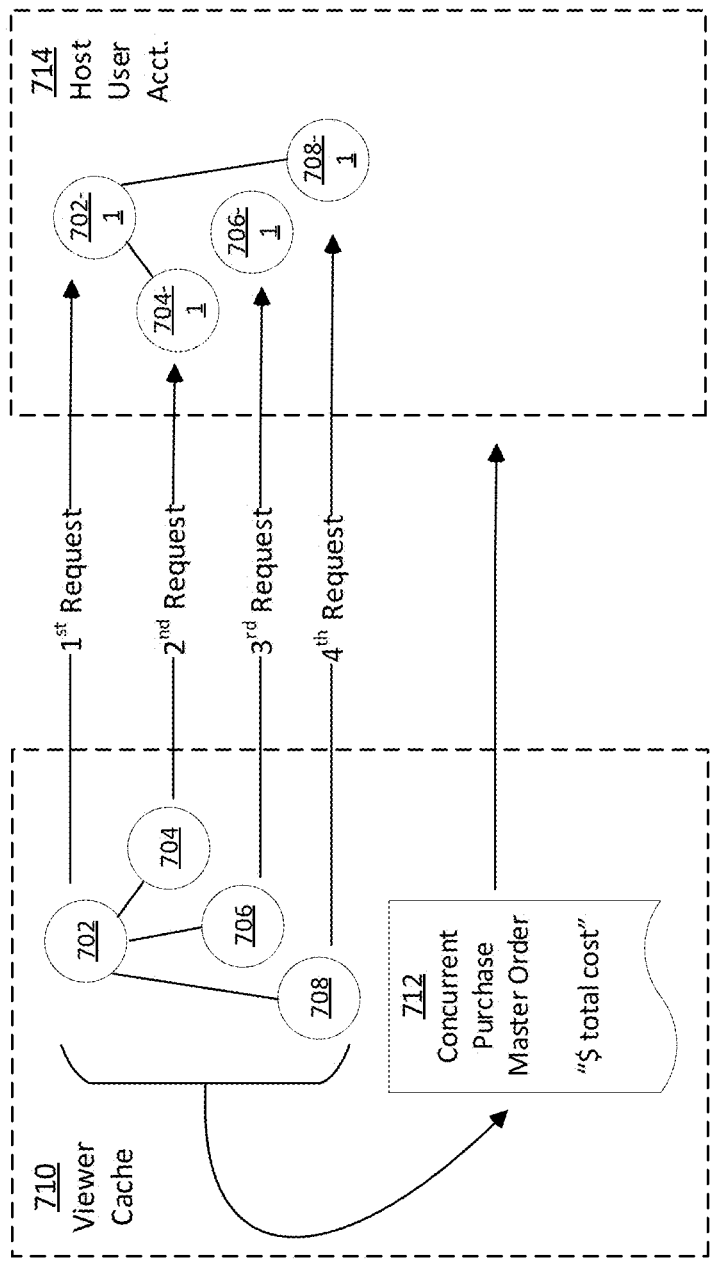
FIG. 7 is a diagram illustrating an exemplary environment in which some embodiments may operate.

The cache module 108 of the system 100 may perform functionality for as illustrated in FIGS. 2, 6 and 7.

The time range module 110 of the system 100 may perform functionality as illustrated in FIGS. 2, 5, 6 and 7.

The purchase module 112 of the system 100 may perform for functionality as illustrated in FIGS. 2, 3, 4, 5, 6 and 7.

It is understood that execution of one or more operations, steps and/or acts described herein may be performed by the system 100, the application engine 142 and/or distributed across the system 100 and the application engine 142.

According to various embodiments, a live video stream may be sent to a viewer computer device(s) associate with a viewer user account and a host computer device associated with a host user account. The live video stream includes a view of an item from a perspective of a camera of the host computer device. The view of the item may be displayed within a graphical user interface at the host computer device. Video data is sent from the host computer device in order for display of the view of the item within respective graphical user interfaces of viewer computer devices. The live video stream may thereby be based on the host computer device's video data. The live video stream may include the video data received from the host computer device and stream data, such as one or more inserted thumbnails, notifications, functionalities, purchase requests, etc. As such, the live video stream for the host computer device may be based on the stream data (i.e. inserted thumbnails, notifications, functionalities) without the video data since the video data originates from the host computer device and will be displayed at the host computer device via the camera. The live video stream sent to the viewer computer device(s) will be based on the video data and stream data. According to a peer-to-peer embodiment, one or more modules may be distributed across the host computer device and one or more viewer computer devices that work in coordination with each other to execute any and all of the operations, steps and acts described herein.

The O.C. Engine detects a first request from a viewer user account to a host user account during a first session, such as a first live video stream (Act 202). The O.C. Engine generates a parent node associated with the first request (Act 204). The parent node is associated with a range of time selected by the host user account. The O.C. Engine triggers a first cache command associated with the viewer user account's first request to store a record of the first request at the viewer computer device associated with the viewer user account. In some embodiments, the parent node may be cached at the viewer computer device.

The O.C. Engine detects a subsequent second request from the viewer user account to the host user account (Act 206). The O.C. Engine generates a node for the subsequent second request (Act 208). The O.C. Engine triggers a second cache command associated with the viewer user account's second request to store a record of the second request at the viewer computer device. In some embodiments, the node for the subsequent second request may be cached at the viewer computer device. The O.C. Engine verifies the subsequent second request is not an initial request from the viewer user account to the host user account and that is has been detected prior to expiration of the range of time (Act 210). Upon verification, the O.C. Engine identifies the node as a child node by linking the parent node and the child node (Act 212). For example, the O.C. Engine may trigger an operation to associate a parent node unique identifier with the child node cached at the viewer computer device.

It is understood that some of the acts of exemplary flowchart 200 may be performed in different orders or in parallel. Also, one or more of the acts in the exemplary flowcharts 200 and 320 may occur in two or more computers, for example if the method is performed in a networked environment. Various acts may be optional. Some acts may occur on local computer with other acts occur on a remote computer.

According to various embodiments, multiple parent nodes may correspond with a viewer user account, where each parent node (and its respective child nodes) are based on requests sent to a differing specific host user account. Each respective parent node may initiate a separate instance of the range of time. For example, a first parent node may correspond to a purchase request from a viewer user account during live video stream of a first host user account. Generation of the first parent node triggers a first instance of the range of time. Additional purchase requests sent from the viewer user account to the first host user account may be represented by child nodes connected to the first parent node if the additional purchase requests were sent during the first instance of the range of time. A second parent node may correspond to a purchase request from the same viewer user account during a live video stream of a different second host user account. Generation of the second parent node triggers a second instance of the range of time. Additional purchase requests sent from the viewer user account to the second host user account may be represented by child nodes connected to the second parent node if the additional purchase requests were sent during the second instance of the range of time.

The range of time may be modified by a respective host user account. For example, if the range of time is 12 hours. The first host user account may modify the range of time to 10 hours. Upon modification of the range of time, no additional child nodes will be linked to the first parent node 10 hours after the first parent node was generated. However, the modification of the range of time to 10 hours may not be applied to the second parent node because the second parent node is associated with purchase request sent to the second host user account. The range of time selected by the second host user account may be 12 hours or any other range of time. The second host user account may modify the range of time initiated upon generation of the second parent child as well.

A first parent order may be compiled based on the first parent node and its respective child nodes upon expiration of the first range of time and a second first parent order may be compiled based on the second parent node and its respective child nodes upon expiration of the second range of time. The first parent order provides the benefit of concurrent purchase from the first host user account of all the purchase requests sent during the first range of time and the second parent order provides the benefit of concurrent purchase from the second host user account of all the purchase requests sent during the second range of time. The first and second parent orders may each only have a single shipping charge despite both parent orders representing bundled purchase requests.

Figure 3:
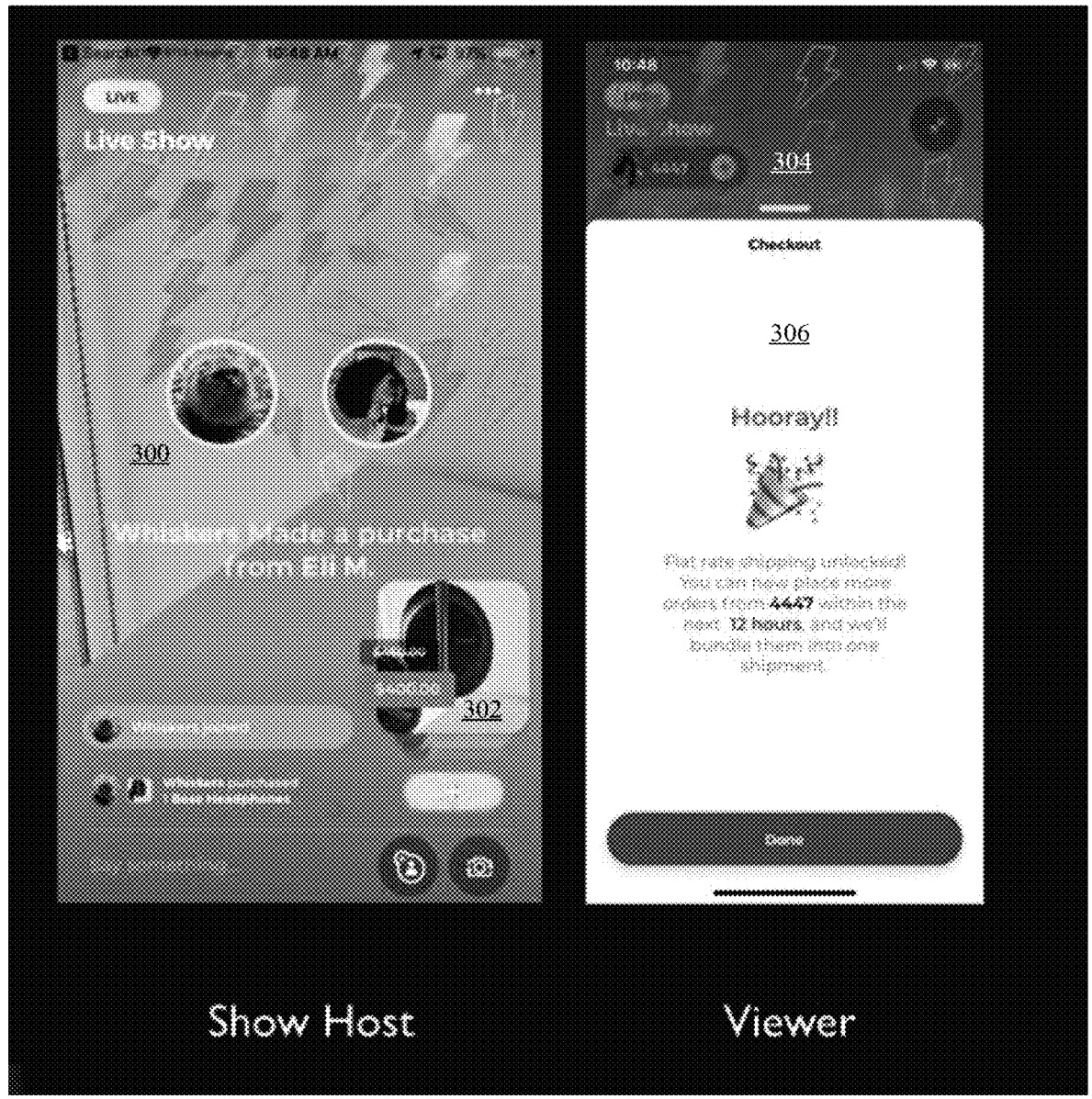
FIG. 3 is a diagram illustrating an exemplary environment in which some embodiments may operate.

As shown in FIG. 3, a host graphical user interface (GUI) 300 may display a live video stream at a host computer device. The live video stream may include a first listing thumbnail 302 in the stream data. The first listing thumbnail 302 represents a first item available for purchase from the host user account during the live video stream, where the host user account may have an inventory that includes multiple instances of the item. The live video stream may similarly be displayed in a viewer GUI 304 at a viewer computer device. The viewer user account may send a first purchase request to the host user account to purchase the first item represented in the listing thumbnail 302. If the O.C. Engine detects there are no active parent nodes for purchase requests sent from the viewer user account to the host user account, the O.C. Engine may generate a parent node the represents the first purchase request and cache the parent node at the viewer computer device. The O.C. Engine may initiate an instance of a range of time upon generation of the parent node.

The viewer user account may complete a purchase of the first item represented by the parent node. A purchase confirmation GUI 306 may be displayed at the viewer computer device. The purchase confirmation GUI 306 may include an indication of how much time is remaining in the range of time during which additional child nodes may be generated and linked to the parent node. Data (item, price, payment account, addresses) for the parent node from the purchase confirmation may be cached by the O.C. Engine at the viewer computer device as well.

Figure 4:
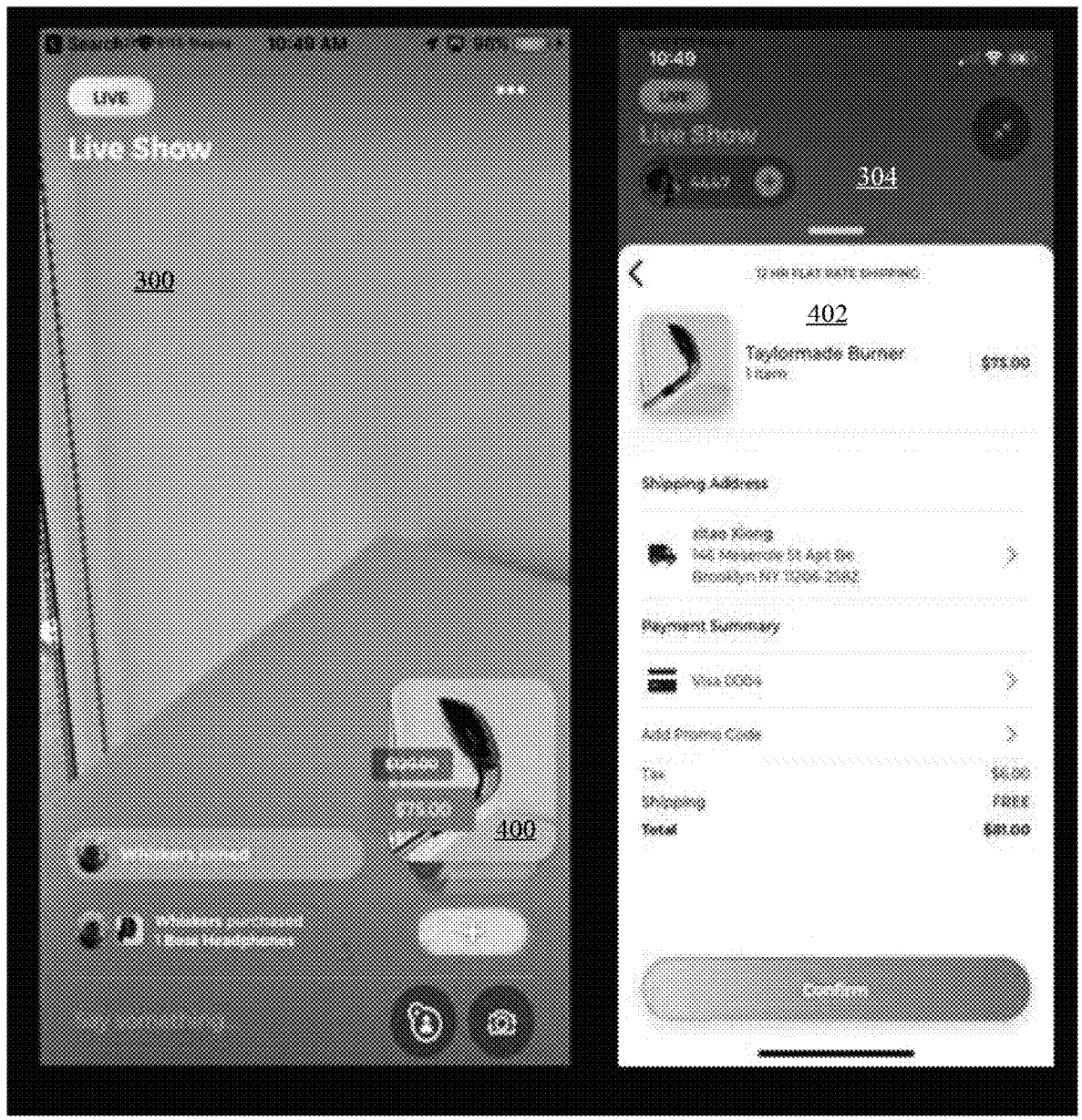
FIG. 4 is a diagram illustrating an exemplary environment in which some embodiments may operate.

As shown in FIG. 4, the host GUI 300 displays the live video stream that includes a second listing thumbnail 400 representing a second item for sale by the host user account during the live video stream. The O.C. Engine detects a second purchase request to purchase the second item. The O.C. Engine verifies the parent node has been created and, this, the second purchase request is not an initial purchase request sent to the host user account from the viewer user account. The O.C. Engine generates a node to represent the second purchase request and caches the node at the viewer computer device. The O.C. Engine triggers display of a payment GUI 402 over the viewer GUI 304. The viewer user account provides payment information for the purchase of the second item. The O.C. Engine may further cache the payment information in association with the cached node. The O.C. Engine links the cached node to the cached parent node in order to identify the cached node as a child node. The first purchase request for the first item is thereby linked to the second purchase request for the second item a represented by the linked parent and child nodes.

Upon expiration of the range of time that is initiated upon generation of the parent node, The O.C. Engine halts the generation of additional child nodes that can be linked to the parent node. Each node may represent a request from the viewer user account to purchase an item from the host user account and payment information for effecting a purchase of a respective item. The O.C. Engine merges the parent node and connected child nodes into a parent order. For example, the O.C. Engine triggers collection of parent and linked child nodes cached at the viewer computer device to generate the parent order at the viewer computer device. The parent order represents a series of purchase requests sent from the viewer user account to the host user account during the range of time that was initiated upon generation of the parent node. According to various embodiments, the parent order may be a transaction order for concurrent purchase of all the viewer user account's purchase requests.

Figure 5:
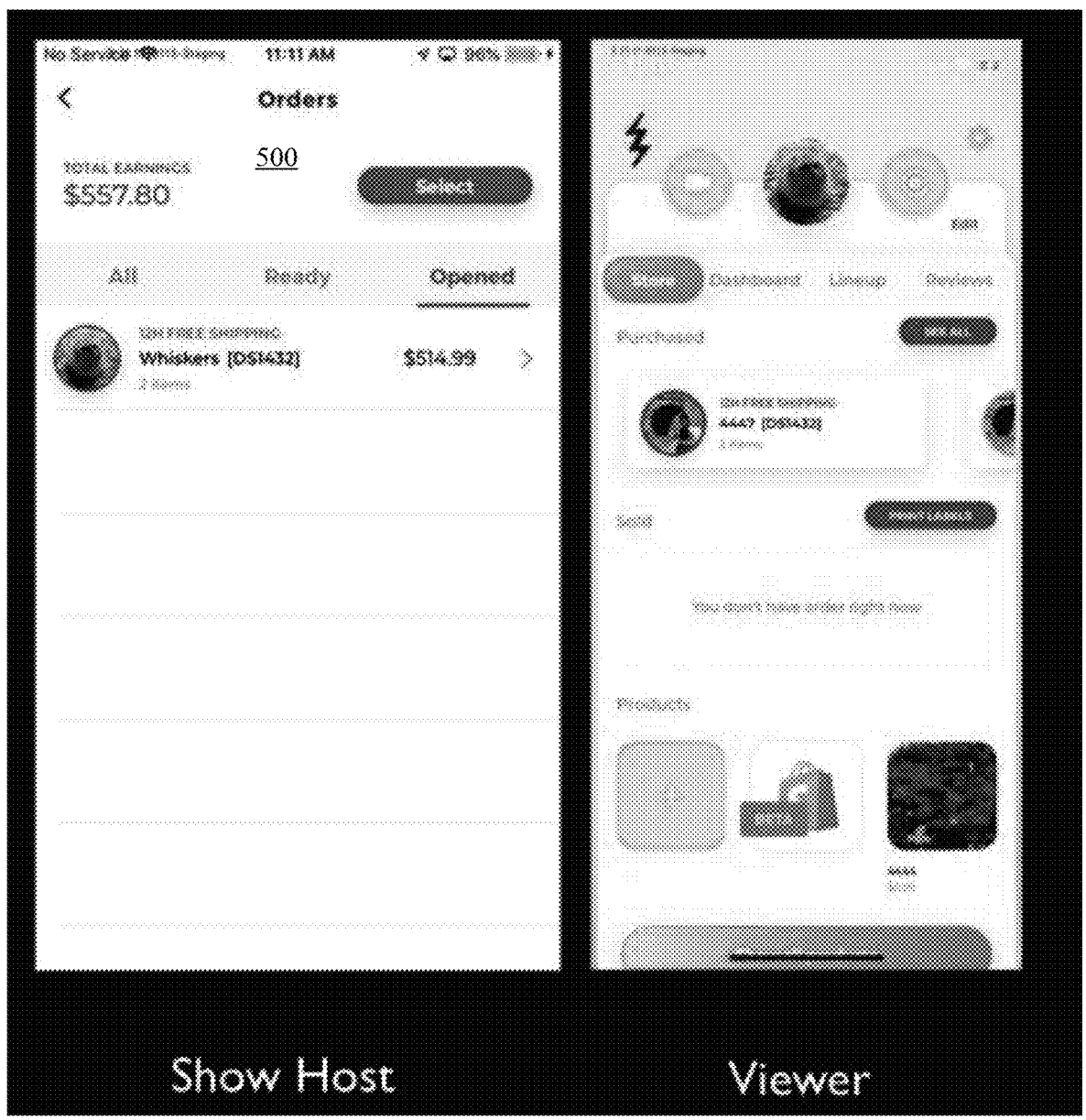
FIG. 5 is a diagram illustrating an exemplary environment in which some embodiments may operate.

As shown in FIG. 5, the O.C. Engine generates a parent order (i.e. transaction order) for purchase requests sent from a viewer user account (i.e. "Whiskers"). The parent order may be displayed in an orders GUI at the host computer device.

The O.C. Engine triggers calculation of the total cost of all the orders listed in the transaction order (i.e. the parent order). However, a single shipping fee may be charged to the entire transaction order, even though the transaction order includes bundle purchase requests sent from the viewer user account. Compiling all the parent and child nodes into a single transaction order thereby provides the advantage of assessing a single shipping fee for all orders in the transaction order. According to one example, the shipping fee may be determined upon generation of the parent node with respect to the first purchase request. Calculation of the total cost may occur at the viewer computer device where the parent and child nodes are cached.

The total cost of the transaction order (i.e. the parent order) may be displayed at the viewer computer device and sent to a purchase module associated with the O.C. Engine. The purchase module may be remotely located from the viewer computer device. For example, the purchase module may be part of the O.C. Engine and may further be implemented at a server(s) or via a cloud computing platform. The O.C. Engine may trigger the transaction order (i.e. the parent order) to be sent to the purchase module. The purchase module may receive the transaction order (i.e. the parent order) and perform a calculation to verify the total cost of the transaction order. The purchase module may have access to a data repository that stores data from the viewer user account's purchase requests and the pricing information of the respective items associated with the those purchase requests. The purchase module may calculate the total cost based on the pricing information in the data repository. Upon verifying the total cost, the purchase module may send a request for payment to the viewer user account and the purchase module may receive the payment form the viewer user account via the viewer computer device.

As shown in FIG. 6, a parent order 600 may include a parent node 602 with respective links to multiple child nodes 604, 606, 608, 610, 612. Each node 602, 604, 606, 608, 610, 612 represents a request to purchase an item sent from a viewer user account to a host user account during one or more live video streams hosted by the host user account. Each purchase request may be a request to purchase an item from the host user account. Each item may have been displayed in the live video stream via a perspective of a view of a camera associated with the host computer device.

Each node 602, 604, 606, 608, 610, 612 represents a purchase request that was sent by the viewer user account during the range of time selected by the host user account. The range of time is triggered upon generation of the parent node 602 by the O.C. Engine. The parent node 602 is active until the range of time expires. For example, the range of time may be 48 hours and the host user account may host three different live video streams that occur within a period of 48 hours. The parent node 602 represents a first purchase request sent during a first live video stream. The second node 604 is a child node that represents a subsequent purchase request sent during a second live video stream 614. The third, fourth, fifth, sixth nodes 606, 608, 610, 612 are each a child node that represents a subsequent purchase request sent during a third live video stream 616. Even though the purchase requests represented by the child nodes 604, 606, 608, 610, 612 were received across different live video streams, they are linked to the parent node 602 due to being received during the range of time. A shipping fee 602-1 is assessed for shipment of the item in the first purchase request represented by the parent node 602. The shipping fee 602-1 is assessed upon generation of the parent node 602 and prior to generation of the child nodes 604, 606, 608, 610, 612

As shown in FIG. 7, a parent node 702 linked to respective child nodes 704, 706, 708 may be stored in a cache memory 710 of a viewer computer device. Each node 702, 704, 706, 708 represents an item purchase request (e.g. $1^{st}$ Request, $2^{nd}$ Request, $3^{rd}$ Request, $4^{th}$ Request) sent from a viewer user account associated with the viewer computer device to a host user account 714. Each item purchase request represented by child nodes 704, 706, 708 was submitted prior to an expiration of a range of time that was initiated upon generation of the parent node 702.

The O.C. Engine detects expiration of the range of time and triggers compilation of the nodes 702, 704, 706, 708 at the viewer cache 710 into a parent order 712 for the concurrent purchase of the items associated with the various item purchase requests. According to various embodiments, the parent order 712 may include an image of each item being purchased via the parent order 712. Each respective image may be based on a portrayal of a view of an item as it was displayed in the live video stream, where the view of the item is from a perspective of a camera associated with the host computer device. The O.C. Engine triggers calculation of a total cost for concurrent purchase at the viewer computer device. The total cost may be based on pricing information of each item at the time a correspond item purchase request was sent. The O.C. Engine may trigger the viewer computer device to send the parent order 712 to the host user account 714.

The host user account 714 received each respective item purchase request and may have access to a record 702-1, 704-1, 706-1, 708-1 of each item purchase request received from the viewer user account. For example, each record 702-1, 704-1, 706-1, 708-1 may have been created contemporaneously to each item purchase request to which is corresponds. In addition, each record 702-1, 704-1, 706-1, 708-1 may further include payment account information for each item purchase request. For example, the viewer user account may have submitted different payment accounts (e.g. different credit card numbers) to be charged for different item purchase requests. According to another example, one of the item purchase requests may have applied the price of the desired item against a remaining credit balance the viewer user account had with the host user account. The host user account 714 receives the parent order 712 and accesses the pricing information in the records 702-1, 704-1, 706-1, 708-1 to verify whether the total cost listed in the parent order 712 is accurate. Upon verifying the total cost is accurate, the O.C. Engine triggers a concurrent purchase of each item listed in the parent order 712 according to the payment information associated with each node 702, 704, 706, 708.

Figure 8:
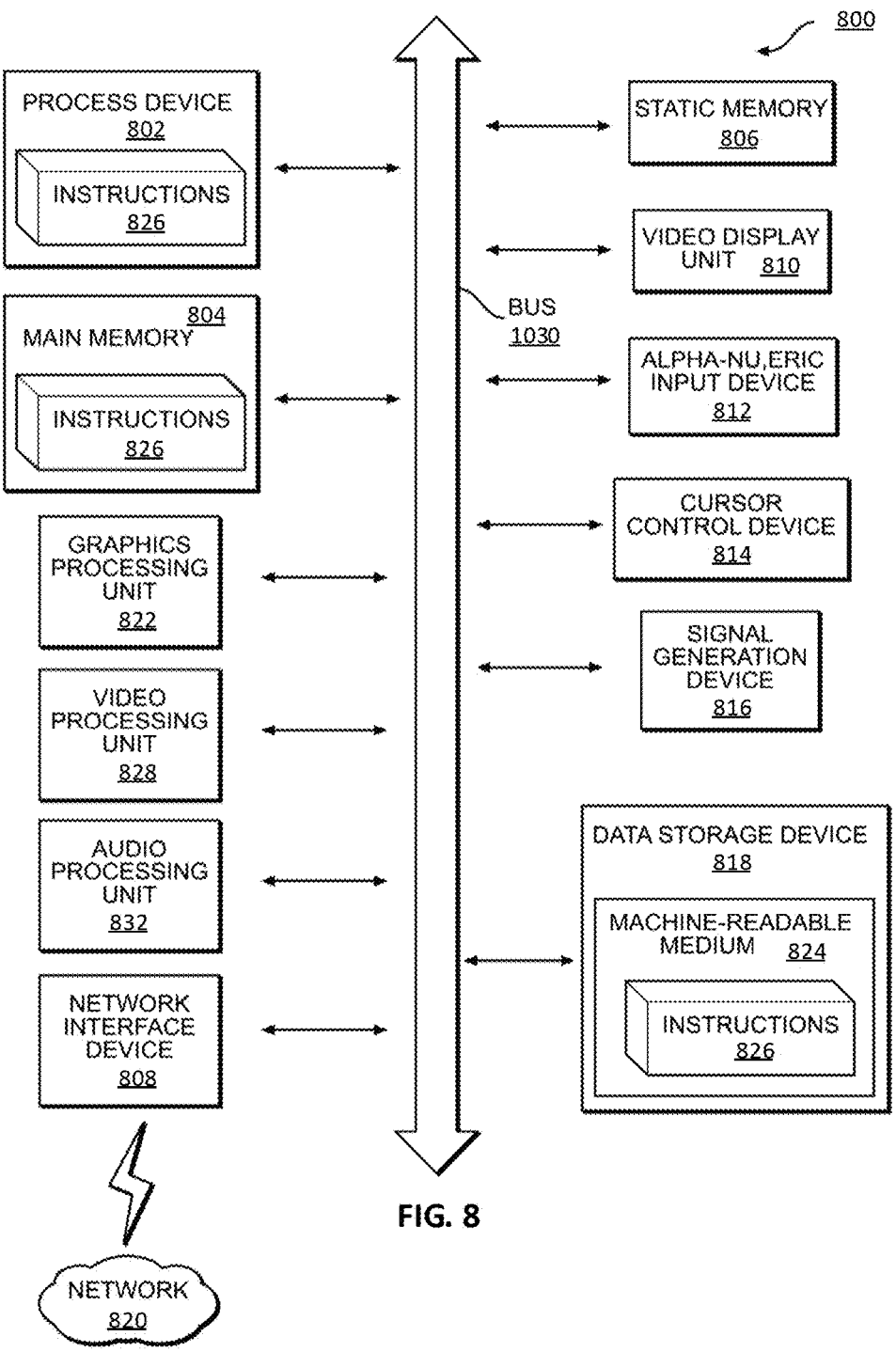
FIG. 8 is a diagram illustrating an exemplary computer that may perform processing in some embodiments.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to the components of a device to perform the disclosure herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
 receiving a first request sent from a requesting user account during a first live video stream session associated with a host user account, the host user account associated with multiple live vide stream sessions accessible by the requesting user account, the first request identifying first content portrayed during the first live stream;

generating a parent node for the requesting user account to be active for a range of time selected by the host user account, the parent node indicating the first content;

receiving a subsequent second request sent from the same requesting user account to the host user account during a second live video stream session, associated with the host user account, occurring after completion of the first live video stream session, the second request identifying second content portrayed during the second live stream;

generating a node for the requesting user account, the node indicating the second content; and verifying the subsequent second request from requesting user account is received prior to expiration of the time range that corresponds with generation of the active parent node for the same requesting user account;

upon verification, identifying the node as a child node by generating a link to connect the parent node and the child node;

upon expiration of the range of time for the active parent node;

initiating a concurrent action related to the first content indicated in the inactive parent node and related to the second content indicated in the child node.

2. The computer-implemented method of claim 1, further comprising:
wherein each respective session associated with the host user account comprises a live video stream associated with a host computer device, the live video stream including content captured via a camera of the host computer device;
wherein the host user account comprises a host user account for the live video stream;
wherein the requesting user account comprises a viewer user account viewing the live video stream via a viewer computer device.

3. The computer-implemented method of claim 2, wherein generating a parent node associated with first request comprises:
generating the parent node due to the first request being an initial request from the viewer user account to purchase a first item portrayed in the first live video stream content captured via a camera of the host computer device.

4. The computer-implemented method of claim 3, wherein the initial request to purchase the item portrayed in the first live video stream content further comprises a request from the viewer user account to purchase the first item from the host user account.

5. The computer-implemented method of claim 3, wherein receiving a subsequent second request sent from the requesting user account to the host user account comprises:
receiving a second request from the viewer user account to purchase a second item, from the host user account, portrayed in the second live video stream content captured via the camera of the host computer device.

6. The computer-implemented method of claim 5, wherein verifying the subsequent second request is received prior to expiration of the time range comprises:
accessing storage that corresponds with a current status of the parent node;
verifying the current status of the parent node as active due to the range of time having not expired; and upon verification, creating a parent order by linking the node as a child order connected to the parent order.

7. The computer-implemented method of claim 6, wherein the parent order comprises a transaction order for concurrent purchase of the first item portrayed by the first content from the first live video session and the second item portrayed by the second content from the second live video session upon expiration of the range of time.

8. A system comprising:
one or more processors; and
a non-transitory computer readable medium storing a plurality of instructions, which when executed, cause the one or more processors to:
receive a first request sent from a requesting user account during a first live video stream session associated with a host user account, the host user account associated with multiple live vide stream sessions accessible by the requesting user account, the first request identifying first content portrayed during the first live stream;
generate a parent node for the requesting user account to be active for a range of time selected by the host user account, the parent node indicating the first content;
receive a subsequent second request sent from the requesting user account to the host user account during a second live video stream session associated with the host user account occurring after completion of the first live video stream session, the second request identifying second content portrayed during the second live stream;
generate a node for the requesting user account, the node indicating the second content;
verify the subsequent second request is received prior to expiration of the time range that corresponds with generation of the active parent node; and
upon verification, identify the node as a child node by generating a link to connect the active parent node and the child node;
upon expiration of the range of time for the active parent node;
initiating a concurrent action related to the first content indicated in the inactive parent node and related to the second content indicated in the child node.

9. The system of claim 8, further comprising:
wherein each respective session associated with the host user account comprises a live video stream associated with a host computer device, the live video stream including content captured via a camera of the host computer device;
wherein the host user account comprises a host user account for the live video stream;
wherein the requesting user account comprises a viewer user account viewing the live video stream via a viewer computer device.

10. The system of claim 9, wherein generate a parent node comprises:
generate the parent node due to the first request being an initial request from the viewer user account to purchase a first item portrayed in the first live video stream content captured via a camera of the host computer device.

11. The system of claim 10, wherein the initial request to purchase the item portrayed in the first live video stream content further comprises a request from the viewer user account to purchase the first item from the host user account.

12. The system of claim 10, wherein receive the parent node due to the first request being an initial request from the viewer user account to purchase a first item portrayed in the first live video stream content captured via a camera of the host computer device.

13. The system of claim 12, wherein verify that the subsequent second request is received prior to expiration of the time range comprises:
accessing storage that corresponds with a current status of the parent node;
verifying the current status of the parent node as active due to the range of time having not expired; and
upon verification, creating a parent order by linking the node as a child order connected to the parent order.

14. The system of claim 13, wherein the parent order comprises a transaction order for concurrent purchase of the first item portrayed by the first content from the first live video session and the second item portrayed by the second content from the second live video session upon expiration of the range of time.

15. A computer program product comprising a non-transitory computer-readable medium having a computer-readable program code embodied therein to be executed by one or more processors, the program code including instructions to:
receive a first request sent from a requesting user account during a first live video stream session associated with a host user account, the host user account associated with multiple live vide stream sessions accessible by the requesting user account, the first request identifying first content portrayed during the first live stream;
generate a parent node for the requesting user account to be active for a range of time selected by the host user account, the parent node indicating the first content;
receive a subsequent second request sent from the requesting user account to the host user account during a second live video stream session associated with the host user account occurring after completion of the first live video stream session, the second request identifying second content portrayed during the second live stream;
generate a node for the requesting user account, the node indicating the second content;
verify the subsequent second request is received prior to expiration of the time range that corresponds with generation of the active parent node; and
upon verification, identify the node as a child node by generating a link to connect the active parent node and the child node;
upon expiration of the range of time for the active parent node;
initiating a concurrent action related to the first content indicated in the inactive parent node and related to the second content indicated in the child node.

16. The system of claim 15, further comprising:
wherein each respective session associated with the host user account comprises a live video stream associated with a host computer device, the live video stream including content captured via a camera of the host computer device;
wherein the host user account comprises a host user account for the live video stream;
wherein the requesting user account comprises a viewer user account viewing the live video stream via a viewer computer device; and
wherein generate a parent node comprises:
generate the parent node due to the first request being an initial request from the viewer user account to purchase a first item portrayed in the first live video stream content captured via a camera of the host computer device.

17. The system of claim 16, wherein receive a subsequent second request comprises:
receive a second request from the viewer user account to purchase a second item, from the host user account, portrayed in the second content portrayed in the second live video stream content captured via the camera of the host computer device; and
upon verification, create a parent order by linking the node as a child order connected to the parent order, wherein the parent order comprises a transaction order for concurrent purchase of the first item and the second item upon expiration of the range of time.

18. The computer-implemented method of claim 1, further comprising:
receiving a selection by the host user account of the range of time having a start time associated with generation of the parent node, the start time of the parent node's range of time subsequent to a start time of the first session.

* * * * *